Aug. 3, 1954 A. J. KAVANAGH 2,685,228
PHASE CONTRAST OPTICAL INSTRUMENT
Filed May 13, 1949 2 Sheets-Sheet 1
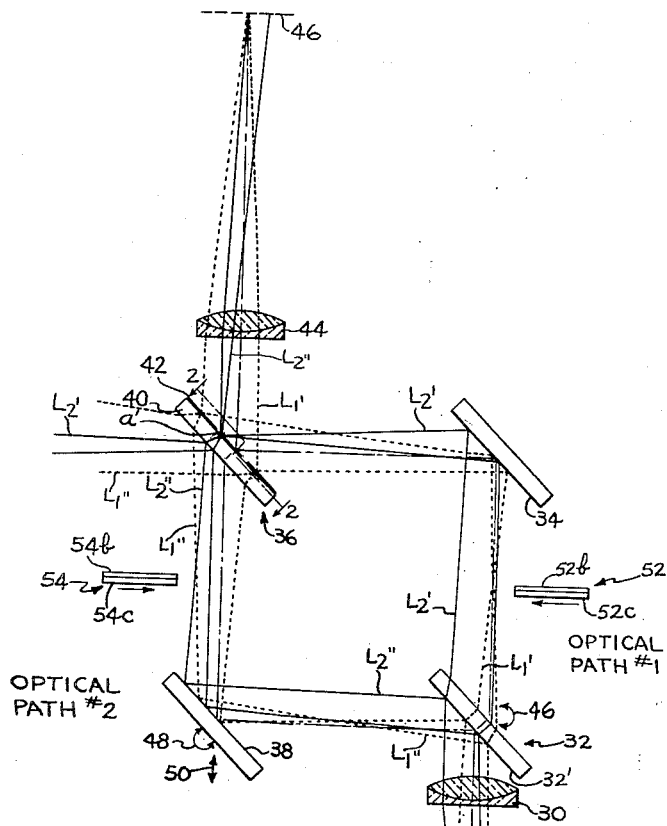
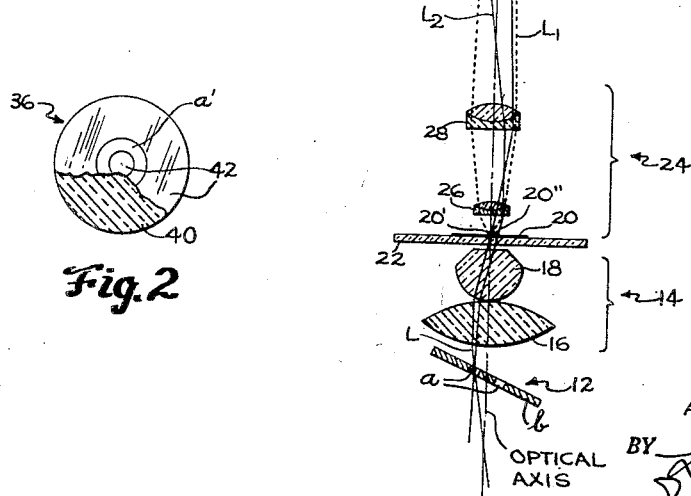
*Fig. 1*
*Fig. 2*
INVENTOR.
ARTHUR J. KAVANAGH
BY
ATTORNEYS Aug. 3, 1954

A. J. KAVANAGH 2,685,228

PHASE CONTRAST OPTICAL INSTRUMENT

Filed May 13, 1949

INVENTOR.
ARTHUR J. KAVANAGH
ATTORNEYS

Patented Aug. 3, 1954

2,685,228

UNITED STATES PATENT OFFICE 2,685,228

PHASE CONTRAST OPTICAL INSTRUMENT

Arthur J. Kavanagh, Buffalo, N. Y., assignor to American Optical Company, Southbridge, Mass., a voluntary association of Massachusetts Application May 13, 1949, Serial No. 93,037

5 Claims. (Cl. 88—39)

This invention relates to modification of light rays within an optical system for the purpose of gradually altering contrast effects in the visible image of an object under observation. More particularly, the invention relates to an optical system for a microscope which is adapted to the observation of specimens wherein differences of optical path and light transmission are not clearly perceptible through usual microscope means.

An object or specimen of the type considered herein may be considered as constituting a plurality of particles and surrounding regions having small differences of optical path (thickness times refractive index) and/or small transmission differences. To further an understanding of the present invention, a single particle and its surround and the relation of light rays thereto will be considered.

In known methods of phase contrast microscopy it is customary to employ a diaphragm adjacent the entrance pupil of an optical system for admitting light of a given transverse contour to a condenser. The latter directs the light upon an object or specimen and an objective and eyepiece are employed in a conventional manner. At the back focal plane of the optical system constituted by the objective and condenser a special light-modifying element is positioned for altering phase and/or amplitude differences which exist between deviated (diffracted) and undeviated light rays emanating from the specimen. Some of the light rays incident the particle are deviated thereby as, for example, due to discontinuity of optical path at the edge of the particle, and may be considered as retarded in phase and consisting of higher orders of spectra. Other light rays incident the particle emerge therefrom as undeviated rays and constitute the zero order. Light passing through the surround may be considered as substantially undeviated for purposes of illustration. The undeviated rays emerging from the particle and surround are spread throughout a visible image plane such as the field of an eyepiece. The deviated rays or spectra are brought to a focus on a part of the eyepiece field and are combined with overlapping portions of the undeviated rays to form a geometrical image of the particle. During their transmittal by the aforesaid light-modifying element, the deviated and undeviated rays are selectively altered in phase and/or amplitude so that reinforcing or destructive interference occurs therebetween to provide bright or dark contrast of the particle with respect to the surround, as desired.

The present invention involves novel means for separating and reuniting deviated and undeviated light rays emanating from an object and for altering the above-described phase and amplitude relationships therebetween. Relatively widely separated paths are provided for the deviated and undeviated bundles of light rays whereby each of said bundles of rays may be readily altered, substantially without affecting the other. Moreover, a gradual or progressive modification of said rays throughout a predetermined range is rendered possible, said modification being difficult of accomplishment where the deviated and undeviated rays are propagated along contiguous paths. Gradual modification of phase and amplitude differences makes a wide variety of gradations of contrast in the image available to the microscopist. With respect to other known variable phase contrast systems, it is believed that constructions of the present invention possess distinct advantages because of their relative simplicity and compactness.

While a diaphragm is shown and described herein as a preferred means for admitting light, other means may be employed for a similar purpose. The term "light," as used herein, is not necessarily restricted to those wave lengths of radiant energy to which the human eye is sensitive but may comprise other forms of radiant energy, including those in the invisible portions of the spectrum. Accordingly, any suitable primary or secondary light source may be utilized in the optical systems of the invention. A diaphragm, having an aperture of predetermined dimensions and contour, as employed herein, provides a secondary light source and may, it is believed, properly fall within the meaning of the term light source. Other light sources which could be positioned similarly to the diaphragm and which are contemplated by the invention comprise an incandescent filament, a fluorescent tube, a reflecting surface, the image of a lamp filament or of an aperture, or the image of some other source of radiant energy.

An object of the invention is to provide a simple and efficient optical system for the examination of an object or specimen which permits the obtaining of improved contrast effects in the image thereof.

Another object of the invention is to provide such an optical system which is particularly adapted to a microscope.

A further object of the invention is to provide an optical system of the character described wherein the alteration of contrast is obtainable in a gradual and progressive manner.

Still another object of the invention is to provide an optical system wherein phase and amplitude modification of light rays emanating from an object may readily and effectively be accomplished for varying contrast in an image thereof.

A still further object of the invention is to provide an optical system in which gradual modification of such phase and amplitude relationships may be performed without appreciable loss of light.

Another object of the invention is to provide suitable coacting optical elements and a compact optical system for obtaining the aforesaid results.

These and other objects of the invention will be apparent from the following description taken in connection with the accompanying drawings, wherein like reference characters refer to like parts throughout the several views of which:

Figure 1 is a diagrammatic view of an optical system constituting one embodiment of the invention wherein separate optical paths are provided for deviated and undeviated light rays emanating from an object, and wherein means are included for gradually varying phase and amplitude relationships therebetween;

Fig. 2 is a front detail view of a component employed in the optical systems of Figs. 1 and 3;

Figure 3:
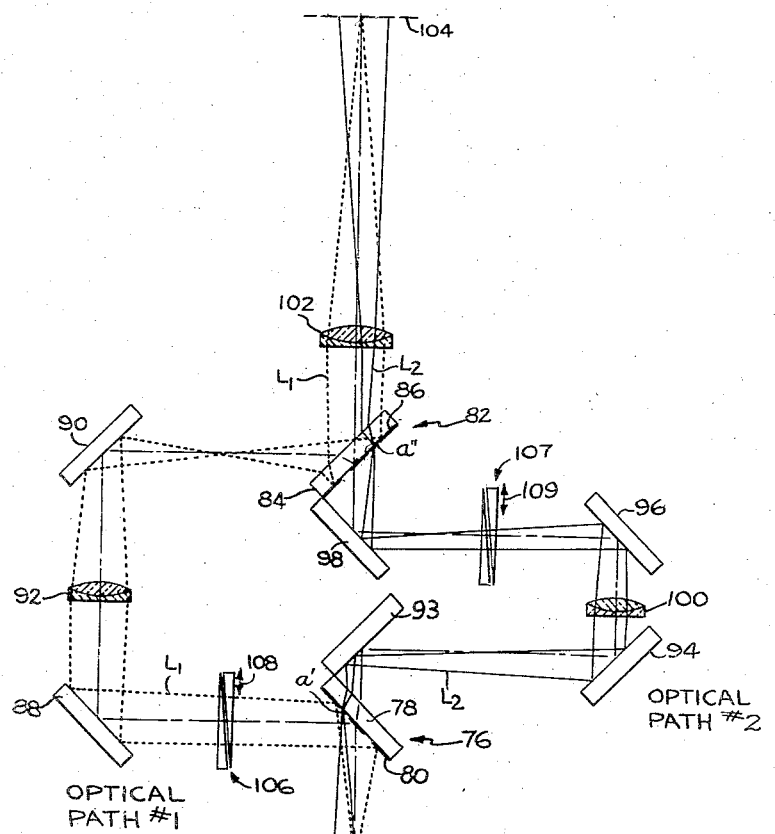
Fig. 3 is a diagrammatic view of an optical system representing another embodiment of the invention.

The optical system shown in Fig. 1 is adapted to be employed in a microscope. A diaphragm 12 is positioned at the entrance pupil of the system for admitting light from a source (not shown) and, accordingly, constitutes a secondary light source or, simply, a light source, within the meaning thereof hereinbefore described. Diaphragm 12 has an annular light aperture $a$, formed in opaque portions $b$, whereby light emanating from said aperture is of a predetermined contour. While aperture $a$ constitutes a preferred embodiment, it is to be understood that other shapes and sizes of apertures may be employed. For purposes of illustration, a single bundle of light rays L emanating from but a single point of the aperture is shown, it being understood that a plurality of such bundles will emerge from various points throughout said aperture. A condenser 14, comprising elements 16 and 18, is provided for directing the light rays upon a specimen 20, which is mounted upon a transparent plate or slide 22. An objective 24, which may suitably comprise components 26 and 28, is positioned above the specimen. It is to be understood that the objective operates at its proper conjugates in forming an image of the specimen and that the combined optical properties of the condenser, slide, specimen coverglass (not shown) and objective are such as to form an image of diaphragm 12 in a plane which may appropriately intersect the optical axis adjacent the second principal focal point of the objective or, otherwise stated, adjacent the back focal point or exit pupil of the combined system of the condenser and objective.

A lens 30 is positioned above objective 24 and may be considered either as an auxiliary lens or as a component of the objective. The function of said lens is to project the above mentioned image of diaphragm 12 to a preferably planar surface intersecting the optical axis at a point forwardly thereof, said surface being further described hereinafter. A suitable beam-splitter 32 follows auxiliary lens 30 in the optical system. Beam-splitter 32 may appropriately be in the form of a plane parallel plate, preferably composed of glass, having a semi-reflecting surface 32'.

The light rays L may be considered as directed upon specimen 20 so as to pass through a particle 20' thereof and also through a surrounding region 20''. It may be assumed, for example, that the particle and surround have different thicknesses and/or that they have different refractive indices so that the optical path differs therebetween. As hereinbefore described, they may also differ in absorption characteristics. In passing through the specimen, one portion of light rays L, intercepted thereby, is diffracted or deviated as by discontinuity of optical path at the edges of the particle, and is represented by the dotted lines $L_1$. The other portion of the light rays $L_2$ passes through the particle and surround as undeviated rays.

When they are directed upon beam-splitter 32, both deviated light rays $L_1$ and undeviated light rays $L_2$ are divided so that portions of each pursue separate optical paths. One part of the rays, which will be designated $L_{1'}$ and $L_{2'}$, are transmitted by element 32. The other part of said rays are reflected by surface 32' and will be designated $L_{1''}$ and $L_{2''}$, the path of the latter rays extending at a suitable angle with respect to that of the transmitted rays as, for example, substantially at right angles thereto, as shown.

From beam-splitter 32, light rays $L_{1'}$ and $L_{2'}$ are transmitted along a first optical path to a reflecting element 34 and thence are reflected to an element 36 which may be said to serve as a selector for rays of a given optical path and as a reuniting element for selected rays of both optical paths. Light rays $L_{1''}$ and $L_{2''}$ are transmitted along a second optical path to a reflecting element 38 and thence are also reflected to element 36. Said first and second optical paths are formed so as normally to be of equal length. The selecting and reuniting element 36, as shown in Figs. 1 and 2, comprises a plane parallel transparent plate 40, preferably formed of glass having a reflecting coating 42 formed thereupon. Reflecting coating or surface 42 may be composed of any suitable substance such as aluminum, rhodium, chromium or the like and may, appropriately, be evaporated or otherwise deposited upon plate 40 by any known method. It will be understood that said coating is greatly exaggerated as to thickness in the drawing. Reflecting coating 42 is adapted both to reflect light rays which pass through plate 40 and are incident said coating and light rays which are incident the opposite side of said coating. An annulus $a'$, consists of a clear or uncoated area formed within reflecting coating 42, which is conjugate to, and thus similar in contour to annular aperture $a$ of the diaphragm. Said annulus is thus termed the conjugate zone and provides an optical path or light aperture extending completely through selector element 36. Reflecting portions 42 are, accordingly, to be considered as forming the complementary zone of selector element 36. Reflecting portions 42 are, accordingly, to be considered as forming the complementary zone of Plate 40 may appropriately be of a similar thickness to that of beam-splitter 32.

The deviated light rays $L_{1''}$ pass through plate 40 and are reflected to one side, as shown, by reflecting coating 42, thus passing out of the system. Undeviated light rays $L_{2''}$ pass through annulus $a'$ and are further transmitted so as to contribute to forming the image of the specimen. The deviated light rays $L_{1'}$ are reflected by reflecting coating or surface 42 and also contribute to formation of the image of the specimen. Undeviated light rays $L_{2'}$ are transmitted through annular light aperture $a'$, as shown, and also pass out of the system. A lens 44 is positioned adjacent element 36 for focusing the image of the specimen upon an image plane 46, such as the field of an eyepiece (not shown). Overlapping portions of light rays $L_{2''}$ are combined and interfere with deviated light rays $L_{1'}$ to form the image of the particle 20' while other portions of light rays $L_{2''}$ form a representation of the surround 20''. It will be understood from the foregoing tracing of the deviated and undeviated light rays that only deviated light rays $L_{1'}$, which traverse the first optical path, and substantially only undeviated light rays $L_{2''}$, which traverse the second optical path are employed in forming the image of the specimen. Moreover, it will be evident that the spacing of said paths readily enables varying the path length of each.

One method for gradually varying the length of path #2, namely, that of the undeviated light rays, would involve pivotal mounting of both beam-splitter 32 and reflecting element 38 and mounting means permitting bodily movement of element 38 whereby the latter could be moved vertically, while still operating properly in a reflecting capacity, said movements being indicated by double-headed arrows 46, 48 and 50. Preferred means for varying optical path length and/or amplitude of the light rays comprise the positioning of components for the purpose in each path. Said components are diagrammatically represented by elements 52 and 54 and could either be permanently located in said paths or positionable therein according to their particular properties. For example, for gradually varying the amplitude relation of deviated and undeviated rays, portions 52b and 52c could consist, respectively, of a polarizer and a rotatable analyzer, and portions 54b and 54c could similarly consist of a polarizer and analyzer or could be in the form of a transparent plate of similar thickness and refractive index to 52b and 52c combined. Light-polarizing sheet materials for forming polarizing elements of a suitable type are well known. Assuming the presence of the polarizer and analyzer in both paths, rotation of the analyzers would serve to vary the amplitude of the deviated image-forming rays in one path and the undeviated rays in the other path. It will be apparent that interlocking means could be provided between the analyzers of both paths whereby, for example, a setting for maximum transmission of the light rays of one path would be accompanied by a setting for extinction of light rays of the other path. By rotating the analyzers 45° from the maximum transmission or extinction positions, similar transmission of light would be permitted in both paths and by further rotating the analyzers 90° from the initial position a reversal of contrast would be obtained, it being understood that intermediate positions would provide various other contrast effects.

Alternatively, elements 52 and 54 could represent phase and amplitude modifying plates of a series which are adapted to be slidably or pivotally introduced into each path. For example, element 54 might represent a glass plate 54c having a coating 54b of a dielectric material such as magnesium fluoride formed thereon for providing a retardation of the rays $L_{2''}$. Accordingly, element 52 might comprise merely a glass plate 52c having a similar thickness and refractive index to plate 54c, or plate 52c might have a metallic coating 52b formed thereon as, for example, a coating of aluminum, rhodium or plutonium for modifying the amplitude of spectra $L_{1'}$. Other elements which could be introduced into the optical paths comprise interchangeable color filters or filters of various densities, optical wedges, pairs of adjustable plane-parallel plates for modifying phase of the light rays, or achromatizing elements for preventing the introduction of color in the image.

The oblique position of element 36 makes it optically necessary to incline diaphragm 12 relative to the optical axis. The required degree of inclination of diaphragm 12 can be computed by known methods and is determined in accordance with the characteristics of other elements of the optical system. Since the surface of element 36 is preferably planar, the diaphragm could advantageously be curved for sharp imaging of the diaphragm at said surface, although such a condition is not deemed essential to operation of the system. Element 36 could be modified so that reflecting and clear portions thereof are reversed as to position relative to those shown in Figs. 1 and 2, such a modification being equally efficient in operation. Accordingly, supposing the conjugate zone $a'$ to be reflecting and the complementary zone to be clear, deviated rays $L_{1''}$ and undeviated rays $L_{2'}$ would be employed in forming the image. Prism means having a semi-reflecting surface could be employed in place of semi-reflecting element 32 if desired and the ray-selecting or reuniting surface of element 36 could also be incorporated with a prism cluster, as will presently be described. In the interests of compact arrangement, it might be desirable to replace lens 39 by two substantially identical lenses, one lens being positioned in optical path #1 as, for example, adjacent beam-splitter 32, and the other in optical path #2 adjacent said beam-splitter.

In Fig. 3 an optical system is shown wherein the aforementioned advantages due to provision of separate optical paths for the deviated and undeviated light rays are present, but wherein appreciably no light is lost through dividing and selectively propagating said rays. Accordingly, substantially all of the light incident a conjugate zone of the system (undeviated light) traverses one path, while substantially all of the light incident a complementary zone (diffracted or deviated light) traverses a second path. A diaphragm 56, similar to that shown in Fig. 1, is positioned at the entrance pupil of the system and serves as a light source, according to the definition thereof hereinbefore given. Diaphragm 56 comprises a light aperture $a$ formed in opaque portions $b$. A bundle of light rays L is represented as emanating from aperture $a$. A condenser 58, comprising components 60 and 62, is provided for directing the light rays upon a specimen 64 which is mounted upon a slide 66. An objective 68, which may suitably comprise elements 70 and 72, is positioned above the specimen. Image-forming characteristics of the elements thus far described are similar to those above-mentioned relative to Fig. 1.

A lens 74 is positioned adjacent objective 68, said lens being considered either as a component of the objective or as an auxiliary lens. The function of said lens is to project an image of diaphragm 56 upon a surface of a beam-splitting or ray-dividing element 76. Element 76 is similar in construction, to selector 36 of Fig. 1, although somewhat different in function, and comprises a plane-parallel transparent plate 78, having a reflecting coating 80 formed thereon. An annular light aperture $a'$, similar in contour to aperture $a$ of the diaphragm, is formed in said coating. Light rays L are directed upon specimen 64 and are broken into deviated rays $L_1$ and undeviated rays $L_2$, as previously described. Deviated light rays $L_1$ are reflected obliquely from surface 80 while undeviated light rays $L_2$ pass through annulus $a'$.

Light rays $L_1$ and $L_2$ are directed from element 76 along separate optical paths to a reuniting element 82, said element, in its construction, appropriately being substantially a counterpart of selector element 36 (Fig. 1) and dividing element 76 (Fig. 3). Reuniting element 82 comprises a plane-parallel transparent plate 84, preferably of similar thickness to plate 78 of dividing element 76, having a reflecting coating or surface 86 formed thereon. An annular light aperture $a''$ is formed in said coating. A first optical path which is traversed by deviated light rays $L_1$ comprises a pair of reflecting elements 88 and 90 and a lens 92 which contributes to projection of an image of the dividing surface of element 76 and the image of diaphragm 56, formed at said surface, upon reflecting surface 86. A second optical path which is traversed by undeviated light rays $L_2$ comprises reflecting elements 93, 94, 96, and 98 and a lens 100. Lens 100 complements lens 92 by projecting the images of the dividing surface and the diaphragm upon light-transmitting portions of reuniting element 82. Deviated rays $L_1$ pass through plate 84 and are reflected from surface 86 of reuniting element 82, while undeviated rays $L_1$ pass through annulus $a''$ and plate 84. A lens 102 is positioned adjacent reuniting element 82 for focusing the image of the specimen upon the focal plane 104 of an eyepiece (not shown). The first and second optical paths are proportioned so as to be of equal length.

Means for modifying the phase and/or amplitude of the light rays traversing either or both paths may comprise any of the means described relative to Fig. 1, or other means of a suitable type. Accordingly, composite wedge devices 106 and 107, each having a component which is slidable with respect to the other, as indicated by double-headed arrows 108 and 109, are to be considered as representative of any elements of the aforesaid general type which may be employed. Where wedges are utilized, they may be formed of glass for varying phase of the light rays, or may comprise absorptive material for varying amplitude thereof.

It will be apparent that the reflecting and transmitting portions of dividing element 76 and reuniting element 82 could be reversed as to position without changing the resultant obtained. Accordingly, the undeviated light rays would be reflected from said elements while the deviated rays would be transmitted thereby. The relation between oblique inclinations of reuniting element 82 and diaphragm 56 has been described relative to Fig. 1. If the dividing surface 80 and reuniting surface 86 are both planar, which may be considered as a preferred embodiment, the images of the dividing surface, projected by lenses 92 and 100 may depart slightly from planar form. However, provided lenses 92 and 100 operate at magnifications of minus 1, the images should sufficiently approximate said form for practical purposes. Lenses 92 and 100 could be replaced by so-called telescopic or afocal systems of power minus 1 in the interests of providing planar form of said images, if desired.

Figure 4:
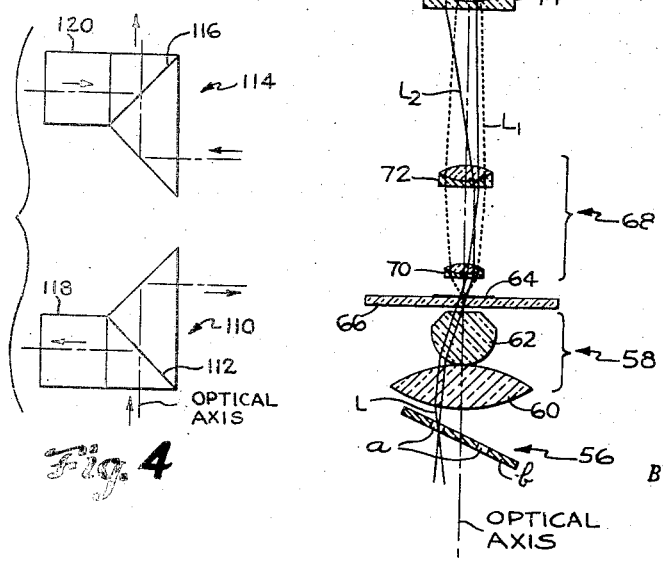
Fig. 4 is a diagrammatic view of a modification of the optical system of Fig. 3.

It is to be understood that dividing surface 80 could be incorporated with a suitable prism cluster, if preferred, instead of the combination of plate 78 and reflecting element 93 and that reuniting surface 86 could also be incorporated with a prism cluster. Such an arrangement is shown in Fig. 4 wherein the prism cluster 110, having dividing surface 112 may be employed in place of elements 76 and 93 of Fig. 3, and wherein prism cluster 114 having reuniting surface 116 may be employed in place of elements 82 and 98 of Fig. 3. Reflecting portions of surfaces 112 and 116 may be deposited upon either of the prism components of each cluster prior to their assembly in any suitable manner as, for example, by an evaporation method. The prism components may preferably be cemented together. Transparent plates 118 and 120 serve to provide identical path lengths of optical path #1 and optical path #2 and thus may be regarded as balancing components for effecting equality of the path lengths.

The systems of Figs. 1 and 3 are not limited to the exact arrangement of elements or number of reflecting surfaces shown, it being apparent that the separate paths could include a rearrangement of elements and/or a lesser or greater number of said reflecting surfaces in modifications of the systems. It is further to be understood that the lens elements shown could be modified in form or number and that various transparent balancing plates, front and rear reflecting surfaces, reflection-reducing coatings or the like may be introduced into the systems for improving the optical performance thereof. Accordingly, such examples as are described herein are merely illustrative and the invention may be otherwise embodied and practiced within the scope of the following claims.

I claim:

1. A phase contrast optical system for obtaining increased contrast effects in an image of an object of relatively low contrast and of a type which will produce deviated and undeviated light rays, said optical system comprising a condenser for illuminating an object when said object is positioned at a predetermined object plane in said optical system, an objective in optical alignment with said condenser so as to jointly form a combined lens system, means providing an area of light of predetermined dimensions and contour substantially at a first focal plane of said combined lens system, said objective being so optically spaced relative to said condenser and said area of light as to direct and focus light rays coming therefrom and undeviated by said object at said object plane substantially at a second focal plane of said combined lens system as an image of said area of light, said objective being at the same time focused substantially at said predetermined object plane so as to direct light rays deviated by said object as image-forming rays toward a first image plane conjugate to said object plane, beam-splitting means positioned in optical alignment with said objective so as to receive said deviated and said undeviated light rays transmitted by said objective and to divide said light rays into first and second light beams, and direct said light beams along first and second optical paths respectively, portions of said first and second optical paths being materially spaced from each other, reflecting means in each optical path for directing said first and second light beams toward a common intersection plane, first auxiliary lens means optically positioned between said objective and said common intersection plane for refocusing said undeviated light rays substantially at said common intersection plane, means for modifying at least one of the phase and amplitude characteristics of the light rays of one of said optical paths relative to the light rays of the other optical path, a selector plate located at said common intersection plane and comprising conjugate and complementary areas of different optical characteristics, one of said conjugate and complementary areas being transparent and the other being opaque and specularly reflecting, said conjugate area being of such predetermined dimensions and contour and so located as to receive the major portion of said undeviated light rays transmitted by said objective, said complementary area being of such size and shape as to receive the major portion of said deviated light rays transmitted by said objective, said selector plate directing a controlled portion of the deviated light rays of one of said optical paths and a controlled portion of the undeviated light rays of the other of said optical paths in overlapping relation toward a second image plane conjugate to said object plane, and second auxiliary lens means positioned between said selector plate and said second conjugate image plane so as to transmit said deviated and undeviated light rays traveling toward said second image plane while refocusing only said deviated light rays coming from said selector plate substantially at said second conjugate image plane, whereby contrast effects in an image of said object at said second conjugate image plane may be obtained.

2. A phase contrast optical system for obtaining increased contrast effects in an image of an object of relatively low contrast and of a type which will produce deviated and undeviated light rays, said optical system comprising a condenser for illuminating an object when said object is positioned at a predetermined object plane in said optical system, an objective in optical alignment with said condenser so as to jointly form a combined lens system, means providing an area of light of predetermined dimensions and contour substantially at a first focal plane of said combined lens system, said objective being so optically spaced relative to said condenser and said area of light as to direct and focus light rays coming therefrom and undeviated by said object at said object plane substantially at a second focal plane of said combined lens system as an image of said area of light, said objective being at the same time focused substantially at said predetermined object plane so as to direct light rays deviated by said object as image-forming rays toward a first image plane conjugate to said object plane, beam-splitting means positioned in optical alignment with said objective so as to receive said deviated and said undeviated light rays transmitted by said objective and to divide said light rays into first and second light beams, and direct said light beams along first and second optical paths respectively, portions of said first and second optical paths being materially spaced from each other, reflecting means in each optical path for directing said first and second light beams toward a common intersection plane, first auxiliary lens means optically positioned between said objective and said beam-splitting means for refocusing said undeviated light rays substantially at said common intersection plane, means for modifying at least one of the phase and amplitude characteristics of the light rays of one of said optical paths relative to the light rays of the other optical path, a selector plate located at said common intersection plane and comprising conjugate and complementary areas of different optical characteristics, one of said conjugate and complementary areas being transparent and the other being opaque and specularly reflecting, said conjugate area being of such predetermined dimensions and contour and so located as to receive the major portion of said undeviated light rays transmitted by said objective, said complementary area being of such size and shape as to receive the major portion of said deviated light rays transmitted by said objective, said selector plate directing a controlled portion of the deviated light rays of one of said optical paths and a controlled portion of the undeviated light rays of the other of said optical paths in overlapping relation toward a second image plane conjugate to said object plane, and second auxiliary lens means positioned between said selector plate and said second conjugate image plane so as to transmit said deviated and undeviated light rays traveling toward said second image plane while refocusing only said deviated light rays coming from said selector plate substantially at said second conjugate image plane, whereby contrast effects in an image of said object at said second conjugate image plane may be obtained.

3. A phase contrast optical system for obtaining increased contrast effects in an image of an object of relatively low contrast and of a type which will produce deviated and undeviated light rays, said optical system comprising a condenser for illuminating an object when said object is positioned at a predetermined object plane in said optical system, an objective in optical alignment with said condenser so as to jointly form a combined lens system, means providing an area of light of predetermined dimensions and contour substantially at a first focal plane of said combined lens system, said objective being so optically spaced relative to said condenser and said area of light as to direct and focus light rays coming therefrom and undeviated by said object at said object plane substantially at a second focal plane of said combined lens system as an image of said area of light, said objective being at the same time focused substantially at said predetermined object plane so as to direct light rays deviated by said object as image-forming rays toward a first image plane conjugate to said object plane, beam-splitting means positioned in optical alignment with said objective so as to receive said deviated and said undeviated light rays transmitted by said objective and to divide said light rays into first and second light beams, and direct said light beams along first and second optical paths respectively, portions of said first and second optical paths being materially spaced from each other, reflecting means in each optical path for directing said first and second light beams toward a common intersection plane, first auxiliary lens means comprising a lens component optically positioned between said objective and said beam-splitting means and a lens component in each of said first and second light beams between said beam-splitting means and said common intersection plane for refocusing said undeviated light rays substantially at said common intersection plane, means for modifying at least one of the phase and amplitude characteristics of the light rays of one of said optical paths relative to the light rays of the other optical path, a selector plate located at said common intersection plane and comprising conjugate and complementary areas of different optical characteristics, one of said conjugate and complementary areas being transparent and the other being opaque and specularly reflecting, said conjugate area being of such predetermined dimensions and contour and so located as to receive the major portion of said undeviated light rays transmitted by said objective, said complementary area being of such size and shape as to receive the major portion of said deviated light rays transmitted by said objective, said selector plate directing a controlled portion of the deviated light rays of one of said optical paths and a controlled portion of the undeviated light rays of the other of said optical paths in overlapping relation toward a second image plane conjugate to said object plane, and second auxiliary lens means positioned between said selector plate and said second conjugate image plane so as to transmit said deviated and undeviated light rays traveling toward said second image plane while refocusing only said deviated light rays coming from said selector plate substantially at said second conjugate image plane, whereby contrast effects in an image of said object at said second conjugate image plane may be obtained.

4. A phase contrast optical system for obtaining increased contrast effects in an image of an object of relatively low contrast and of a type which will produce deviated and undeviated light rays, said optical system comprising a condenser for illuminating an object when said object is positioned at a predetermined object plane in said optical system, an objective in optical alignment with said condenser so as to jointly form a combined lens system, means providing an area of light of predetermined dimensions and contour substantially at a first focal plane of said combined lens system, said objective being so optically spaced relative to said condenser and said area of light as to direct and focus light rays coming therefrom and undeviated by said object at said object plane substantially at a second focal plane of said combined lens system as an image of said area of light, said objective being at the same time focused substantially at said predetermined object plane so as to direct light rays deviated by said object as image-forming rays toward a first image plane conjugate to said object plane, beam-splitting means positioned in optical alignment with said objective so as to receive said deviated and said undeviated light rays transmitted by said objective and to divide said light rays into first and second light beams, and direct said light beams along first and second optical paths respectively, portions of said first and second optical paths being materially spaced from each other, reflecting means in each optical path for directing said first and second light beams toward a common intersection plane, the light directed along each optical path including both deviated and undeviated light rays, first auxiliary lens means optically positioned between said objective and said common intersection plane for refocusing said undeviated light rays of both optical paths substantially at said common intersection plane, means for modifying at least one of the phase and amplitude characteristics of the light rays of one of said optical paths relative to the light rays of the other optical path, a selector plate located at said common intersection plane and comprising conjugate and complementary areas of different optical characteristics, one of said conjugate and complementary areas being transparent and the other being opaque and specularly reflecting, said conjugate area being of such predetermined dimensions and contour and so located as to receive the major portion of said undeviated light rays transmitted by said objective, said complementary area being of such size and shape as to receive the major portion of said deviated light rays transmitted by said objective, said selector plate directing the major portion of the deviated light rays of one of said optical paths and the major portion of the undeviated light rays of the other of said optical paths in overlapping relation toward a second image plane conjugate to said object plane, and second auxiliary lens means positioned between said selector plate and said second conjugate image plane so as to transmit said deviated and undeviated light rays traveling toward said second image plane while refocusing only said deviated light rays coming from said selector plate substantially at said second conjugate image plane, whereby contrast effects in an image of said object at said second conjugate image plane may be obtained.

5. A phase contrast optical system for obtaining increased contrast effects in an image of an object of relatively low contrast and of a type which will produce deviated and undeviated light rays, said optical system comprising a condenser for illuminating an object when said object is positioned at a predetermined object plane in said optical system, an objective in optical alignment with said condenser so as to jointly form a combined lens system, means providing an area of light of predetermined dimensions and contour substantially at a first focal plane of said combined lens systems, said objective being so optically spaced relative to said condenser and said area of light as to direct and focus light rays coming therefrom and undeviated by said object at said object plane substantially at a second focal plane of said combined lens system as an image of said area of light, said objective being at the same time focused substantially at said predetermined object plane so as to direct light rays deviated by said object as image-forming rays toward a first image plane conjugate to said object plane, beam-spliting means positioned in optical alignment with said objective so as to receive said deviated and said undeviated light rays transmitted by said objective and to divide said light rays into first and second light beams, and direct said light beams along first and second optical paths respectively, portions of said first and second optical paths being materially spaced from each other, reflecting means in each optical path for directing said first and second light beams toward a common intersection plane, said beam-splitting means comprising a plate having an opaque specularly reflecting area and a transparent area, first auxiliary lens means optically positioned between said objective and said beam-splitting means for refocusing said undeviated light rays substantially upon one of said areas of said beam-splitting means and so that most of the deviated light rays will be received by the other of said areas thereof, most of said undeviated light rays passing said beam-splitting means being directed along one of said optical paths and most of the deviated light rays passing said beam-splitting means being directed along the other of said optical paths, like supplemental lens means in each optical path, means for modifying at least one of the phase and amplitude characteristics of the light rays of one of said optical paths relative to the light rays of the other optical path, a selector plate located at said common intersection plane and comprising conjugate and complementary areas of different optical characteristics, one of said conjugate and complementary areas being transparent and the other being opaque and specularly reflecting, said conjugate area being of such predetermined dimensions and contour and so located as to receive the major portion of said undeviated light rays transmitted along said optical path of undeviated light rays, said supplemental lens means in the last mentioned optical path focusing the undeviated light rays thereof substantially at said conjugate area, said complementary area being of such size and shape as to receive the major portion of said deviated light rays transmitted by the other optical path, said selector plate directing a controlled portion of the deviated light rays of the one optical path and a controlled portion of the undeviated light rays of the other optical path in overlapping relation toward a second image plane conjugate to said object plane, and second auxiliary lens means positioned between said selector plate and said second conjugate image plane so as to transmit said deviated and undeviated light rays traveling toward said second image plane while refocusing only said deviated light rays coming from said selector plate substantially at said second conjugate image plane, whereby contrast effects in an image of said object at said second conjugate image plane may be obtained.

References Cited in the file of this patent

UNITED STATES PATENTS

| Number | Name | Date |
| --- | --- | --- |
| 2,045,124 | Cummins | June 23, 1936 |
| 2,601,175 | Smith | June 17, 1952 |

FOREIGN PATENTS

| Number | Country | Date |
| --- | --- | --- |
| 636,168 | Germany | Oct. 7, 1936 |